April 27, 1948.                G. O. HACK                2,440,632
              TRACTION DEVICE FOR RESILIENT TIRES AND WHEELS
                    Filed March 3, 1947        4 Sheets-Sheet 1

INVENTOR.
GEORGE O. HACK
BY Richey & Watts
ATTORNEYS

April 27, 1948. G. O. HACK 2,440,632
TRACTION DEVICE FOR RESILIENT TIRES AND WHEELS
Filed March 3, 1947 4 Sheets-Sheet 2
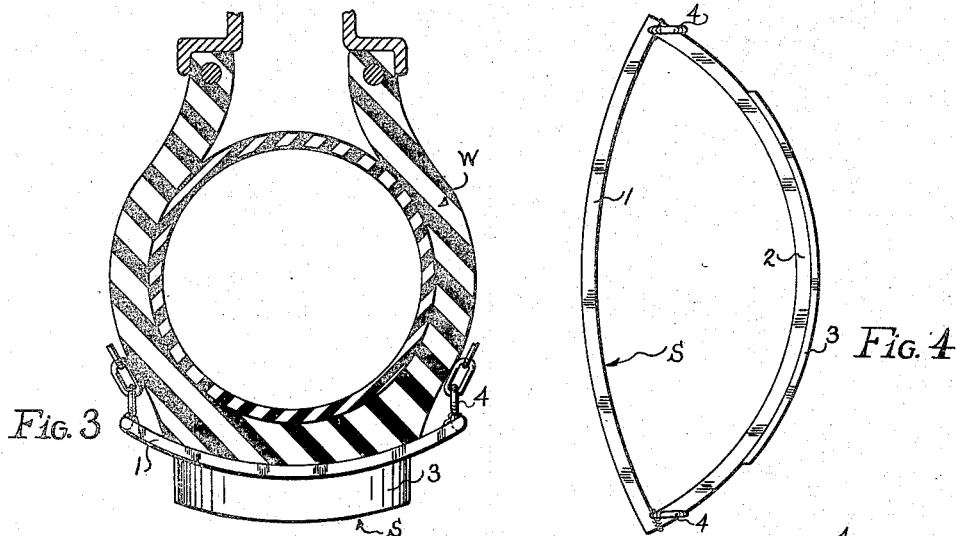
Fig. 3
Fig. 4
Fig. 5
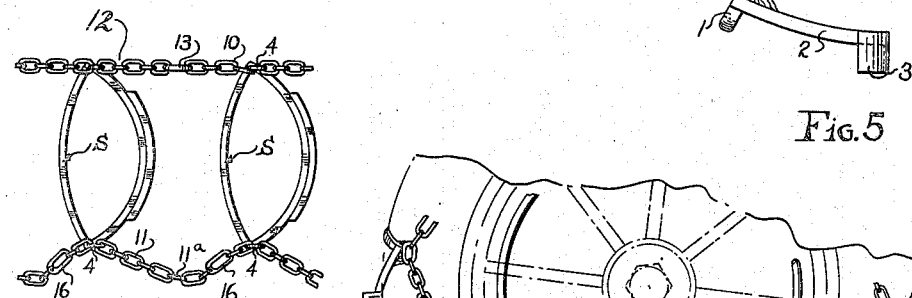
Fig. 7
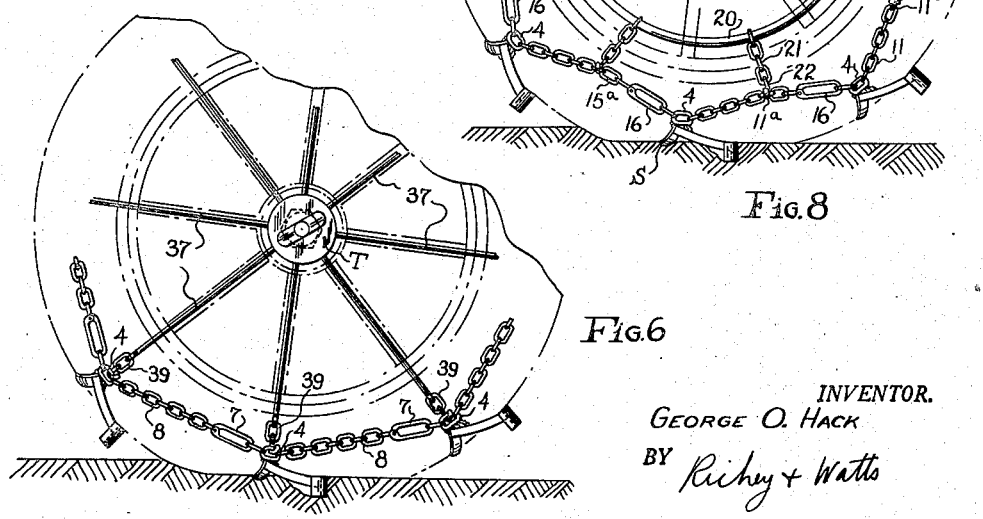
Fig. 8
Fig. 6
INVENTOR.
GEORGE O. HACK
BY Richey + Watts
ATTORNEYS April 27, 1948.  G. O. HACK  2,440,632
TRACTION DEVICE FOR RESILIENT TIRES AND WHEELS
Filed March 3, 1947  4 Sheets-Sheet 3
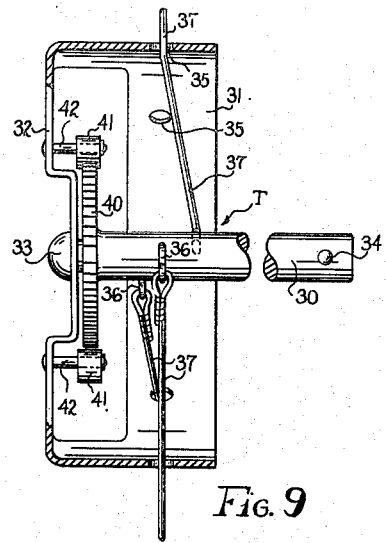
Fig. 9
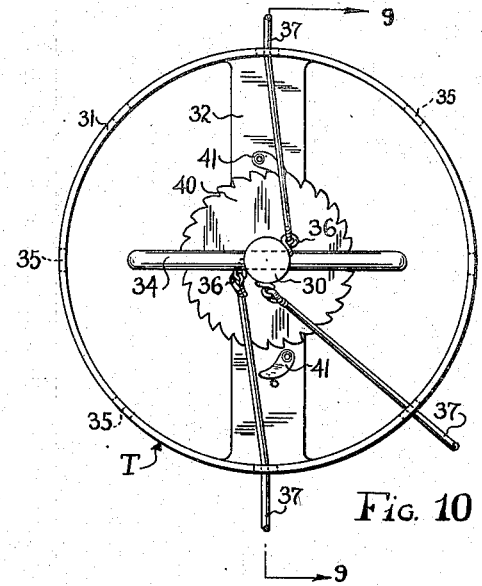
Fig. 10
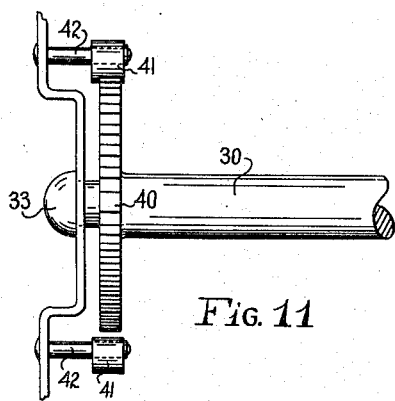
Fig. 11
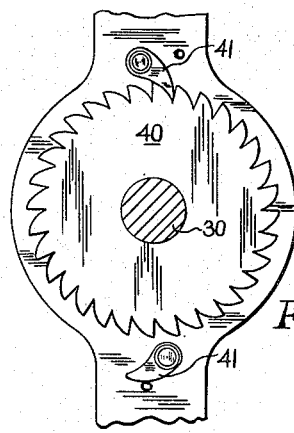
Fig. 12
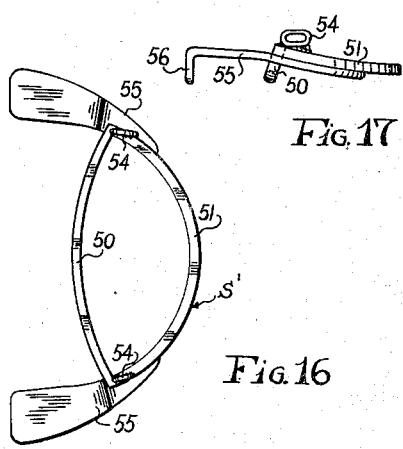
Fig. 17
Fig. 16
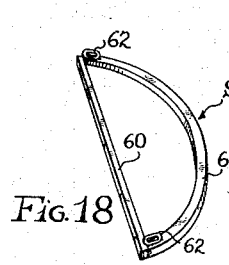
Fig. 18
INVENTOR.
GEORGE O. HACK
BY Richey + Watts
ATTORNEYS April 27, 1948. G. O. HACK 2,440,632
TRACTION DEVICE FOR RESILIENT TIRES AND WHEELS
Filed March 3, 1947 4 Sheets-Sheet 4

INVENTOR.
GEORGE O. HACK
BY Richey & Watts
ATTORNEYS

Patented Apr. 27, 1948

2,440,632

UNITED STATES PATENT OFFICE 2,440,632

TRACTION DEVICE FOR RESILIENT TIRES AND WHEELS

George O. Hack, Hudson, Ohio

Application March 3, 1947, Serial No. 731,901

11 Claims. (Cl. 152—225)

This invention relates to anti-skid and traction devices for resilient tires and wheels and more particularly to such devices that comprise a plurality of relatively rigid traction members mounted upon the tire or wheel by means of tension members disposed at each side thereof, such as chains, bars or the like.

I am aware that numerous devices of this type have been patented and that some of them have been manufactured but all of such devices are subject to various disadvantages which render them either inefficient in performance of their anti-skid function or render them commercially unsuccessful. One of the most serious objections attributable to prior devices of the type to which this invention relates is that when used in heavy mud (which service includes a large percentage of the service given such devices when employed on farm tractors) they tend to fill up or clog with mud in a short time destroying or seriously impairing their effectiveness as traction elements. Various mechanical means have been devised to clean the mud from the pockets in the traction elements and attempts have been made to devise traction lugs which would be self-cleaning but these devices have been either ineffective in actual service or are so expensive as to be beyond the reach of the average implement user. Therefore, it is an object of my invention to provide an anti-skid assembly for tractors or other vehicle wheels that is self-cleaning and, at the same time is simple in construction so that the device can be manufactured and marketed at a price that will make it available to the public at large.

Briefly, I accomplish this object by a novel tension mounting of a relatively simple anti-skid member upon the wheel. I form my cross member so that a forward portion thereof acts as a pivot about the wheel, the pivot being parallel to the wheel axis, the traction element being attached to a rearward portion of the cross member. In one form of my invention the mounting means lie between the pivot and the traction element but closer to the pivot so that the lever arm of the traction element is greater than that of the mounting means, the assembly acting primarily as a lever of the first class.

In operation, as the traction element sinks into the ground, and as the wheel continues its forward motion, reaction of the ground against the lug tends to hold the traction element in the ground until the wheel has passed the point at which it would normally lift the traction cleat portion of the element clear of the ground. Due to the lever action of this mounting and the design of the lug a point is eventually reached wherein the tension exerted by the mounting tending to lift the lug clear overcomes the ground exerted reactions tending to hold the lug and the traction element snaps clear of the ground, striking the tire or wheel. This action effectively frees the lug of the majority of foreign matter or earth which would normally remain lodged about the lug parts. In a modified form of attachment I attain the same action by arranging the tension mounting so that the assembly acts primarily as a lever of the second class.

Other objects of my invention are to provide a traction lug which has no relatively movable parts and to provide one that cannot chafe or abrade the tire as the vehicle is operated.

Still another object of my invention lies in provision of means for attaching the lugs to the wheels and retaining them thereon which places the lugs under relatively great tension on the wheels in order that slipping and chafing of the tire may be avoided, and in order that my self-cleaning function will be effected.

Another object lies in the provision of a special tool that readily permits fitting the lugs to the wheel or tire under relatively high tension with a minimum of effort.

A further object of a modified form of my invention lies in the provision of a lug which has the self-cleaning features described but which is particularly adapted for mounting on the wheels of passenger vehicles and which will not damage the highway.

These and other objects will be apparent to those skilled in the art as the following description of my invention proceeds.

In the drawings:

Fig. 3 is a front elevation of one traction element disposed on the tire with the tire sectioned;

Fig. 4 is a plan elevation and Fig. 5 is a side elevation of the lug;

Fig. 6 shows how the tool tensions the lugs in attaching the form shown in Fig. 2;

Fig. 7 is a partial plan view of several lugs and their connecting chains for a modified form of attaching means;

Fig. 8 shows the tensioning chains and ring finally fitted in the modified attaching arrangement;

Figs. 9 to 12 show details of one form of tool for tensioning the chain during attachment of the lugs;

Figs. 16 and 17 show a modified form of lug with side load plates; and

Fig. 18 shows further modification of a lug adapted for passenger vehicle use in light mud, snow or ice.

Referring to Figs. 1 and 3-5, it can be seen that the preferred form of my lug is a rigid open cross bar structure formed of rigid bars. A curved cross bar 1 has integral therewith or welded thereto a C-shaped bar 2, the latter bar carrying a curved traction cleat 3. The cross bar 1 acts as a pivot for the entire cross member about an axis substantially parallel to that of the wheel. Eye members 4 are welded or otherwise attached to opposite sides of each lug assembly for attachment thereof to the tire and to produce the lever or snap action to be described I mount the eyes relatively close to the pivot bar 1. The cleat 3 is preferably made in arcuate form to minimize deformation of the ground due to turning of the vehicle.

Figure 1:
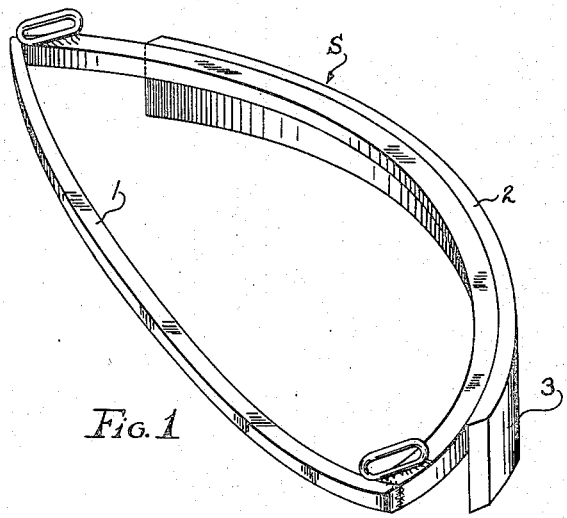
Fig. 1 is a perspective view of the traction element in a preferred embodiment of my invention.
Figure 2:
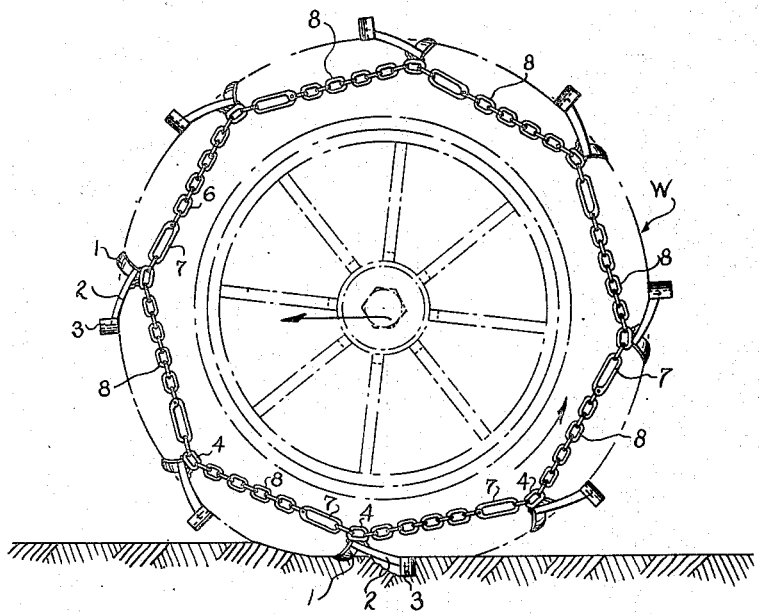
Fig. 2 is a side elevation showing the series of traction elements disposed on a tractor tire, the lug acting primarily as a lever of the first class in this embodiment of my attaching means.

In the form of attachment shown in Fig. 2, I connect the eyes 4 by a series of chain reaches 8 and prefer that the least one of the reaches as at 6 be interrupted and provided with an attaching clasp 7 of conventional design in this art. The inside chain reaches are also provided with one or more attaching clasps. In applying this form of my invention the wheel is either jacked up and the chain assembly disposed around the circumference, or it may be laid along the ground and the wheel driven thereover. The inner clasp or clasps are fastened first, and means to be described later are employed to draw the outer lugs together so that the outer clasp or clasps 7 may be fastened with the entire assembly under relatively high tension.

It is an important feature of my invention that the eye 4 to which the chains are attached is so positioned with relationship to bars 1 and 2 that both bars are urged into intimate engagement with the tire, the bar 1 acting as a pivot. It is important to note that when my traction lug is attached in this manner the tension force exerted by the chain has both radial and tangential components. Since the eyes 4 have a center of effort that be radially inwardly of the pivot bar, the eye can be mounted directly over the pivot bar and the tangential tension force exerted by the chain as the vehicle operates will tend to urge the traction element against the tire, the lug acting as a first class lever. However, I contemplate that normally eyes 4 will be mounted somewhat rearwardly of the pivot point so that the radial component of the tension force also urges the traction element against the wheel. In this case the lug acts as both a first and a second class lever.

As seen in Fig. 6, in applying the anti-skid assembly shown in Fig. 2, I employ a special tool T that hooks to eyes 4 and tensions the lugs inwardly after the inside chain clasps have been fastened. Cables 37 leading from tool T are provided with hooks 39 to engage eyes 4 on the lugs. Tool T has a windlass arrangement for tensioning the cables. After the chain is properly tensioned and the lugs are tight against the tire, I may fasten clasps 7.

Fig. 7 shows a portion of a complete anti-skid assembly which is attached to the wheel in the modified manner with the device acting as a lever of the second class. The inside lug chain is made up of one or more chain reaches 10 attached to eyes 4 and I provide at least one interrupted reach 12 which may contain a conventional chain clasp 13 so that the assembly may be fitted on the tire. The outer chain is provided with one or more reaches 11 which are preferably somewhat longer than their corresponding inside reaches. For example, I may add one more link 11a to the outer reach than in the corresponding inner reach to form even number of links on the inside with link 11a an odd center link on the outside reaches. I also provide one or more clasps 16 in one or more outside interrupted reach as well as in the others. In attaching the form shown in Fig. 7, I attach hooks 39 of the special tool to center links 11a of the chain reaches. I provide a permanent tensioning arrangement such as ring 20 and chain segments 21 provided with hooks 22 that are fastened into center links 11a. Upon fitting this attachment, the tool T may be removed and the entire anti-skid assembly will be permanently fastened to the wheel. It is noted that with this form of attachment the attaching chain tension has a greater radial component so that eyes 4 should be disposed somewhat rearwardly of the pivot point whereupon the eye will act as a lever of the second class.

The details of one form of windless tool that may be employed appear in Figs. 9 to 12. Tool T includes a drum member 30 and a cable guiding sleeve 31 which is pivotally mounted to the drum as at 33. The sleeve 31 is preferably of annular construction and may be supported on the drum by one or more radial arms 32. Handle 34 is provided to wind up the drum and the guiding sleeve is apertured as at 35 to receive cables 37, one for each chain reach. Cables 37 are fastened to the drum by means of hooks or other fastening device 36. With this arrangement the fastening members 36 can be axially disposed along the drum so that clearance will be provided for the cables as they are wound up on the drum and at the same time sleeve 31 insures that all cables will be in the same plane as they tension the chains. Only two cables are shown in Fig. 10 in the interests of clarity, but it is understood that the proper number of cables will be provided according to the design of the anti-skid member. The cables tend to hold sleeve 31 stationary so that I may provide a paw and ratchet assembly that will hold the drum 30 in its tensioned position while the permanent chain fasteners are being applied. For example, a ratchet wheel 40 may be integral with the drum and may be locked in any position by one or more paw members 41 supported by the radial arms 32. Thus, after the chains are applied and the individual clasps locked, hooks 39 are inserted in the center links 11a and the drum 30 is rotated by means of the handle until the proper tension is obtained. The paw and ratchet unit then maintains this tension while the permanent chain tensioning assembly 20 is fitted. I contemplate that other suitable fastening means for clamping the windlass tool in its tensioning position may be substituted for the paw and ratchet assembly such as pins, clamps, etc.

Figure 13:
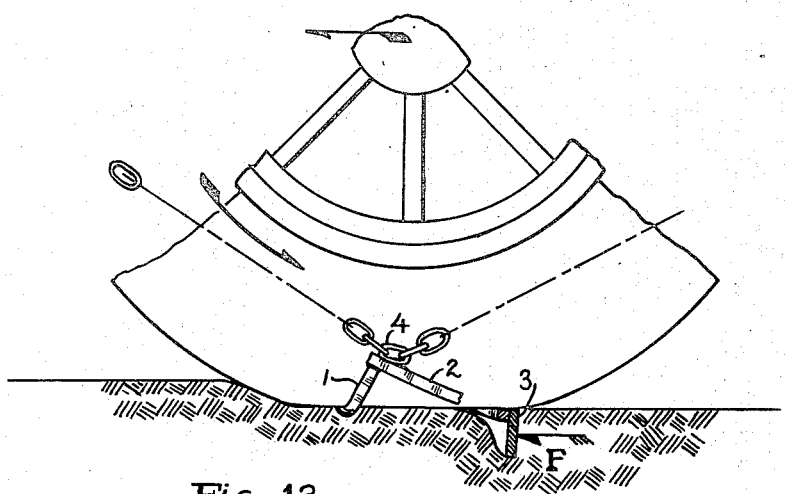
Fig. 13 is an enlarged partial view of a wheel soon after a lug becomes fully engaged with the ground.
Figure 14:
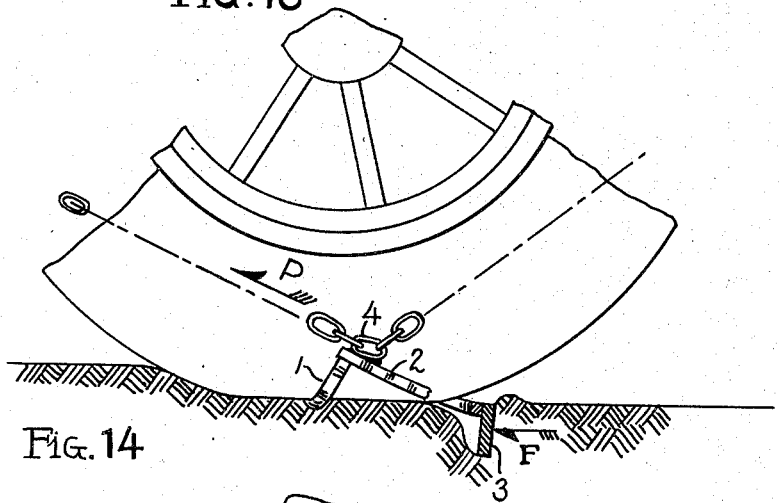
Fig. 14 is a similar view after the wheel has advanced forward somewhat from the position shown in Fig. 13 but before the traction element leaves the ground.
Figure 15:
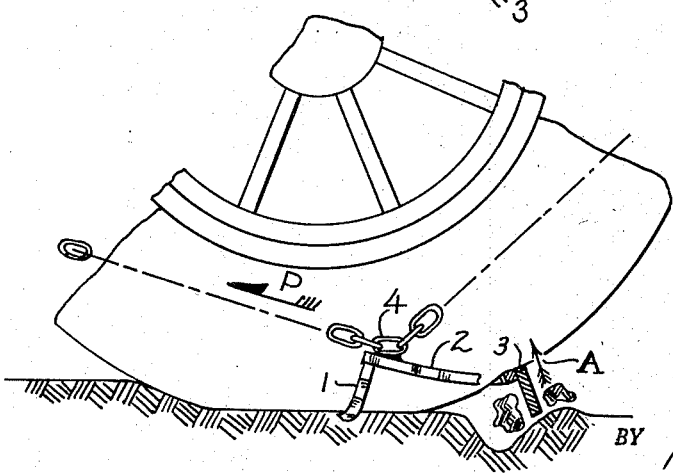
Fig. 15 shows the wheel further advanced just after the traction element has snapped clear of the ground and against the tire.

Figs. 13 to 15 illustrate diagrammatically the self-cleaning action of the preferred form of my invention. In Fig. 13 the lug has been brought against the ground and the cleat 3 has buried itself therein. The traction effort of the vehicle causes the cleat 3 to be urged backwards (to the right in the figure) which motion is opposed by reaction of the ground indicated by a force arrow F on the diagram.

As the wheel continues on its forward motion as shown in Fig. 14, the tire tends to leave cleat 3 which remains in the ground under friction forces and under components of the reaction force F exerted by the ground against the cleat. Although there is a tension force P exerted by the forward chain reach on eye 4 that tends to lift the cleat 3 clear of the ground and maintain it against the tire, the lever arm of this force is smaller than that of the traction cleat. Thus, there will be a certain range of motion of the wheel wherein the reaction force F and the friction force engendered overcome the tension force exerted on eye 4 to thereby hold the cleat 3 in the ground and cause the tire to move forward and away from the cleat. Of course, the chain reaches roll slightly in the attaching eye 4 as this happens. Eventually a point is reached illustrated in Fig. 15 wherein the force P tending to raise the cleat 3 overcomes the torque due to friction and reaction forces and the cleat flies upward against the tire as indicated by the arrow A. As this occurs, any earth or other detritus that would normally tend to cling to the traction lug is jarred loose so that the lug is always clean and capable of performing its traction functions.

Of course, within limits, the closer is the center of effort of eye 4 to the pivot axis of the traction cleat, the longer the cleat 3 will remain in the ground and the greater will be the tendency of the cleat to run loose on the tire or to fly away and outwardly therefrom when clear of the ground due to centrifugal force. Unless the lever arm for the eye is too small, this latter action is largely overcome by applying the proper degree of tension to the attaching chains. If less tension is desired I can attain an effective but somewhat reduced self-cleaning action by attaching eye 4 so that its center of effort is farther from the pivot than it is in the position shown in the drawings. In any event for every weight of traction lug, speed of vehicle travel, etc., a position of the eye 4, and the amount of chain tension can easily be determined for each form of attaching chain to produce optimum results. In fact, I contemplate that eye 4 could be adjustably attached to the bar 2 so that the user would have some control over the operation of the device, but due to the hard service usually given these units I prefer that the eye 4 be placed in its most effective position and permanently attached to the lug.

Figs. 16 and 17 illustrate a modified form which embodies the principles of my invention but which need not have the traction cleat. This is the preferred form for use in lighter service such as that given by passenger vehicles. The cross bar 50 and the C-shaped member 51 and the attaching eyes 54 are elements corresponding to those described previously. However, they may be of lighter construction if employed upon a passenger vehicle. In order to prevent the vehicle from sinking down in snow or soft mud, I weld or otherwise attach side plates 55 formed with cleats 56 which provide a large horizontal supporting surface as well as traction, which is highly desirable under these conditions. Likewise, such plates assist in retaining the cleat in position as the tire rolls over it to produce the self-cleaning action described in connection with the preferred embodiment. It will be noted that in this form the distance between the center of effort of the earth's reaction against the plate and the pivot bar 50 is greater than the lever arm of the attaching means, so that the lug remains stationary for a period as the wheel turns.

Fig. 18 shows still another form adapted for passenger car use wherein no side plates and no separately formed traction cleats are provided. The lug in this modification comprises the cross bar 60, the C-shaped bar 61 and attaching eyes 62. Bars 60 and 61 may be flat since modern tires are flat on the pavement and will provide ample traction on relatively hard surfaces such as packed snow or ice. If this lug is attached in accordance with the principles of my invention it will be self-cleaning and will always be ready to provide maximum traction throughout the life of the unit.

Although I have illustrated a preferred embodiment and several modifications thereof of my invention, I contemplate that other modifications lie within the realm of the skilled mechanic. As mentioned previously, the exact location of the attaching eyelet with respect to the rigid members of the lug may be varied in accordance with the desired operation, chain tension and mounting arrangement. Likewise, so long as the self-cleaning or snap action is obtained I contemplate that the configuration of the cross bars may also be modified it being clear that the self-cleaning action would be obtained if the cross bar were a solid plate, but I prefer that it take the form of a pair of cross bars as described. The essence of my invention resides in the relationship of the engagement of the parts with the ground and with the wheel, the chain tension and location of the attaching eyes to produce the snap lever action described. Of course, any of the well-known attaching and fastening means known in the chain art may be substituted for those illustrated without invention and accordingly I contemplate that the appended claims and not the aforesaid description be determinative of the scope of my invention.

I claim:

1. An anti-skid device for a resilient vehicle wheel tire comprising a relatively rigid cross member for mounting on said wheel tire, a forward portion of said cross member adapted to engage the wheel tire and act as a pivot for said anti-skid device about an axis generally parallel to that of the wheel, ground-engaging means integral with said anti-skid device, said ground-engaging means extending substantially horizontally from the pivot portion of said anti-skid device with the device in ground-engaging position, attaching means on said cross member, and tension means connected to said attaching means for urging the cross member to rotate about said pivot and force the rearward portion of the cross member toward the wheel tire, the lever arm between the center of effort of the earth's reaction against said ground-engaging means and the pivot being more than twice that between the attaching means and the pivot the tension of said tension means being such that reaction of the earth against the ground-engaging means can initially overcome the force exerted by said tension means and cause said anti-skid device to remain stationary relative to the ground as the wheel turns through a given arc, whereafter the ground-engaging means is snapped against the wheel tire to clear it of earth.

2. An anti-skid device for a resilient vehicle wheel tire comprising a relatively rigid cross member for mounting on said wheel tire, traction means associated with a rearward element of said member, a forward portion of said cross member adapted to engage the wheel tire and act as a pivot for said anti-skid device about an axis generally parallel to that of the wheel, attaching means on said cross member, and tension means connected to said attaching means for urging the cross member to rotate about said pivot and force the traction means on the cross member toward the wheel tire, the lever arm between the traction means and the pivot being more than twice that between the attaching means and the pivot, the tension of said tension means being such that reaction of the earth against the traction means can initially overcome the force exerted by said tension means and cause said traction means to remain stationary as the wheel turns through a given arc, whereafter the ground-engaging means is snapped against the wheel tire to clear it of earth.

3. An anti-skid device for a resilient vehicle wheel tire comprising a relatively rigid cross member for mounting on said wheel tire, comprising a forward cross bar and a rearwardly disposed cross bar, connecting means having circumferential extent rigidly connecting said bars, adapted to engage the wheel tire and act as a pivot for said anti-skid device about an axis generally parallel to that of the wheel, attaching means on said cross member, and tension means connected to said attaching means for urging the cross member to rotate about said forward cross bar and force the rearward cross bar toward the wheel tire, the lever arm between the traction means and the pivot axis being more than twice that between the attaching means and the pivot axis the tension of said tension means being such that rotation of the earth against the traction means can initially overcome the force exerted by said tension means and cause said traction means to remain stationary as the wheel turns through a given arc, whereafter the ground-engaging means is snapped against the wheel tire to clear it of earth.

4. An anti-skid device for a resilient vehicle wheel tire comprising a relatively rigid cross member for mounting on said wheel tire, traction means associated with a rearward element of said member, a forward portion of said cross member adapted to engage the wheel tire and act as a pivot for said anti-skid device about an axis generally parallel to that of the wheel, attaching means fixed to said cross member circumferentially adjacent to and radially inwardly of the pivot portion thereof, and tension means connected to said attaching means to apply a tangential force thereto for urging the cross member to rotate about said pivot and force the traction means on the cross member toward the wheel tire, the lever arm between the traction means and the pivot being more than twice that between the attaching means and the pivot, the tension exerted by said tension means being such that reaction of the earth against the traction means can initially overcome the force exerted by said tension means and cause said traction means to remain stationary as the wheel turns through a given arc, whereafter the ground-engaging means is snapped against the wheel tire to clear it of earth.

5. An anti-skid device for a resilient vehicle wheel tire comprising a relatively rigid forward cross member, a generally C-shaped rearward cross member integral with said forward member, attaching means adjacent the junction of said cross members forming the sole attaching means for the device, the forward cross member adapted to engage the wheel tire and act as a pivot for said anti-skid device about an axis generally parallel to that of the wheel.

6. An anti-skid device for a resilient vehicle wheel tire comprising a relatively rigid forward cross member, a generally C-shaped rearward cross member integral with said forward member, a traction cleat integral with said C-shaped member, attaching means adjacent the junction of said cross members forming the sole attaching means for the device, the forward cross member adapted to engage the wheel tire and act as a pivot for said anti-skid device about an axis generally parallel to that of the wheel.

7. An anti-skid device for a resilient vehicle wheel tire comprising a relatively rigid forward cross member, a generally C-shaped rearward cross member integral with said forward member, a supporting plate integral with said device at one side of said device, said plate extending forwardly of said forward cross member, attaching means adjacent the junction of said cross members, the forward cross member adapted to engage the wheel tire and act as a pivot for said anti-skid device about an axis generally parallel to that of the wheel.

8. An anti-skid device for a resilient vehicle wheel tire comprising a relatively rigid forward cross member, a generally C-shaped rearward cross member integral with said forward member, a supporting plate integral with said device at each side of said device, said plates extending forwardly of said forward cross member, attaching means adjacent the junction of said cross members, the forward cross member adapted to engage the wheel tire and act as a pivot for said anti-skid device about an axis generally parallel to that of the wheel.

9. An anti-skid device for a resilient vehicle wheel tire comprising a relatively rigid forward cross member, a generally C-shaped rearward cross member integral with said forward member, a supporting plate integral with said device at each side of said device, said plates extending forwardly of and laterally outwardly of said forward cross member, a traction cleat on one of said plates, attaching means adjacent the junction of said cross members, the forward cross member adapted to engage the wheel tire and act as a pivot for said anti-skid device about an axis generally parallel to that of the wheel.

10. An anti-skid device for a resilient vehicle wheel tire comprising a relatively rigid cross member for mounting on said wheel, a forward portion of said cross member adapted to engage the wheel tire and act as a pivot for said anti-skid device about an axis generally parallel to that of the wheel, a supporting plate integral with said cross member and extending forwardly thereof, said plate being disposed at one side of said cross member, attaching means on said cross member, and tension means connected to said attaching means for urging the cross member to rotate about said pivot and force the rearward portion of the anti-skid device toward the wheel, the lever arm between the center of effort of said plate and the pivot being substantially greater than that between the attaching means and the pivot whereby reaction of the earth against the plate can initially overcome the force exerted by said tension means and cause said anti-skid device to remain stationary as the wheel turns through a given arc.

11. A traction assembly for a resilient vehicle wheel tire comprising a series of anti-skid members, each member having a relatively rigid cross member adapted for mounting on a tire, traction means associated with a rearward element of each member, a forward portion of each cross member adapted to engage the wheel tire and act as a pivot for said anti-skid device about an axis generally parallel to that of the wheel, attaching means rigid with each of said cross members, and a series of tension means directly connecting each of said attaching means to the attaching means on adjacent anti-skid members for urging each cross member to rotate about said pivot and force the traction means on each cross member toward the wheel tire, the lever arm between the traction means and the pivot of each anti-skid member being substantially greater than that between the attaching means and the pivot, the tension of said tension means with the traction assembly mounted on a tire being such that reaction of the earth against one of the traction means can initially cause adjacent traction members to deform the tire through force transmitted by said tension means and cause said one traction means to remain stationary as the wheel turns through a given arc, whereafter the ground-engaging means is snapped against the wheel tire to clear it of earth.

GEORGE O. HACK.

REFERENCES CITED

The following references are of record in the file of this patent:

UNITED STATES PATENTS

| Number | Name | Date |
|---|---|---|
| 1,101,198 | Lashar | June 23, 1914 |
| 1,371,140 | Ballach | Mar. 18, 1923 |